Dec. 2, 1941.  J. S. SHARPE ET  2,264,484
RADIAL ENGINE
Filed May 11, 1940   5 Sheets-Sheet 1

Inventors
John S. Sharpe
Louis S. Clarke
by their Attorneys
Howson & Howson

Dec. 2, 1941.   J. S. SHARPE ET AL   2,264,484
RADIAL ENGINE
Filed May 11, 1940   5 Sheets-Sheet 2

Inventors
John S. Sharpe
Louis S. Clarke
by their Attorney
Howson & Howson

Dec. 2, 1941.   J. S. SHARPE ET AL   2,264,484
RADIAL ENGINE
Filed May 11, 1940   5 Sheets-Sheet 3

Inventors
John S. Sharpe
Louis S. Clarke
by their Attorneys
Howson & Howson

Dec. 2, 1941.  J. S. SHARPE ET AL  2,264,484
RADIAL ENGINE
Filed May 11, 1940  5 Sheets-Sheet 4
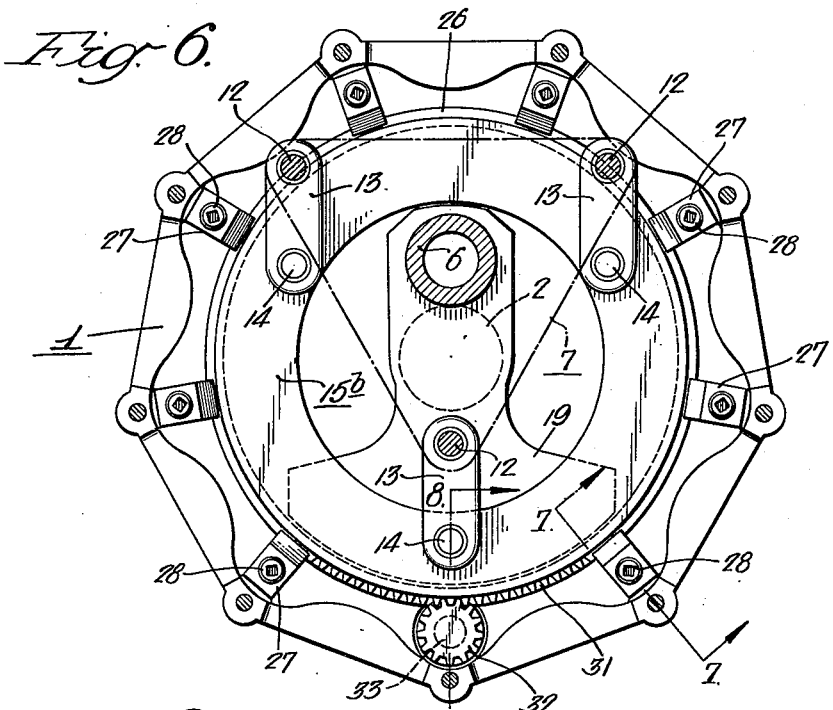
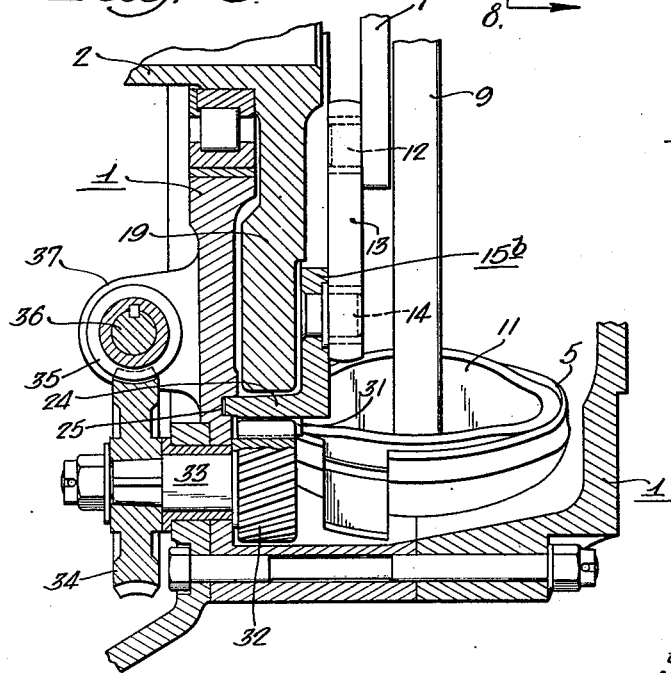
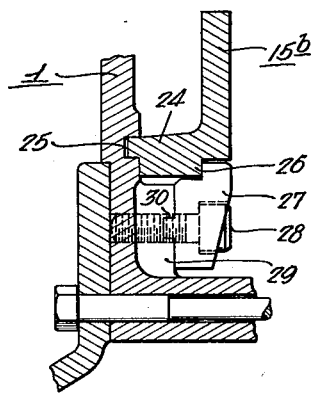
Inventors:-
John S. Sharpe
Louis S. Clarke
by their Attorneys
Howson & Howson

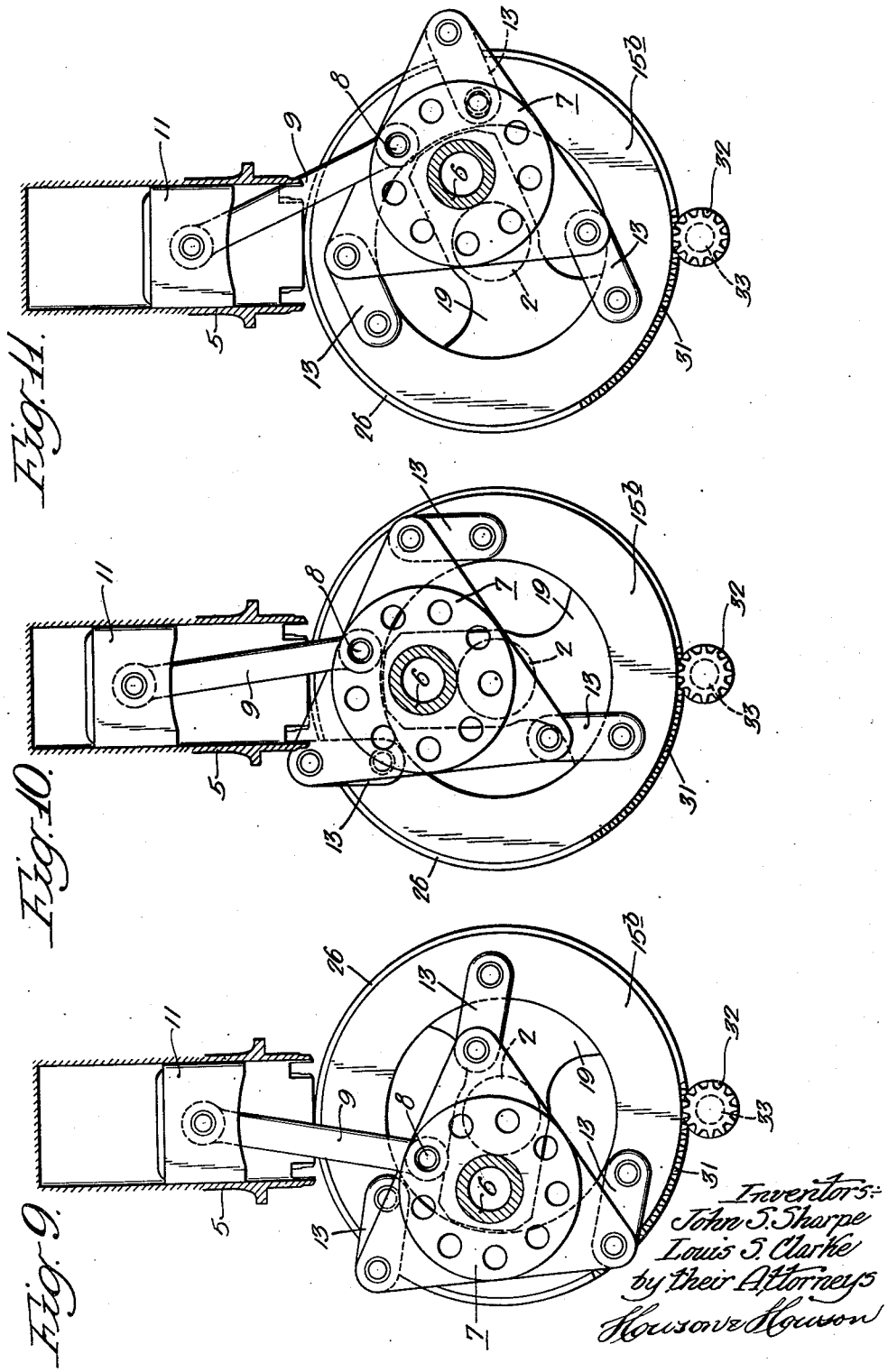

Patented Dec. 2, 1941

2,264,484

UNITED STATES PATENT OFFICE 2,264,484

RADIAL ENGINE

John S. Sharpe, Haverford, Pa., and Louis S. Clarke, Palm Beach, Fla.; said Clarke assignor to said Sharpe Application May 11, 1940, Serial No. 334,662

6 Claims. (Cl. 74—580)

A principal object of this invention is to provide a simple, compact, and highly practical "true stroke" connection between the pistons of a radial type engine and the common crank, with elimination of the conventional master connecting rod and its attendant recognized disadvantages.

Another object is to provide, as a useful adjunct of the above-mentioned novel construction, improved and simplified means for varying the strokes of the pistons with relation to the other engine functions, such, for example, as "firing" in the case of gas engines, and fuel injection in the case of solid fuel or Diesel engines.

Still another object of the invention is to provide a connecting rod assembly for engines of the stated type which affords a more favorable piston action, as hereinafter described.

In the attached drawings:

Fig. 6 is a reduced fragmentary sectional view corresponding to Fig. 3 illustrating the structural details of a preferred form of the modification shown diagrammatically in Fig. 5;

Figures 1, 4:
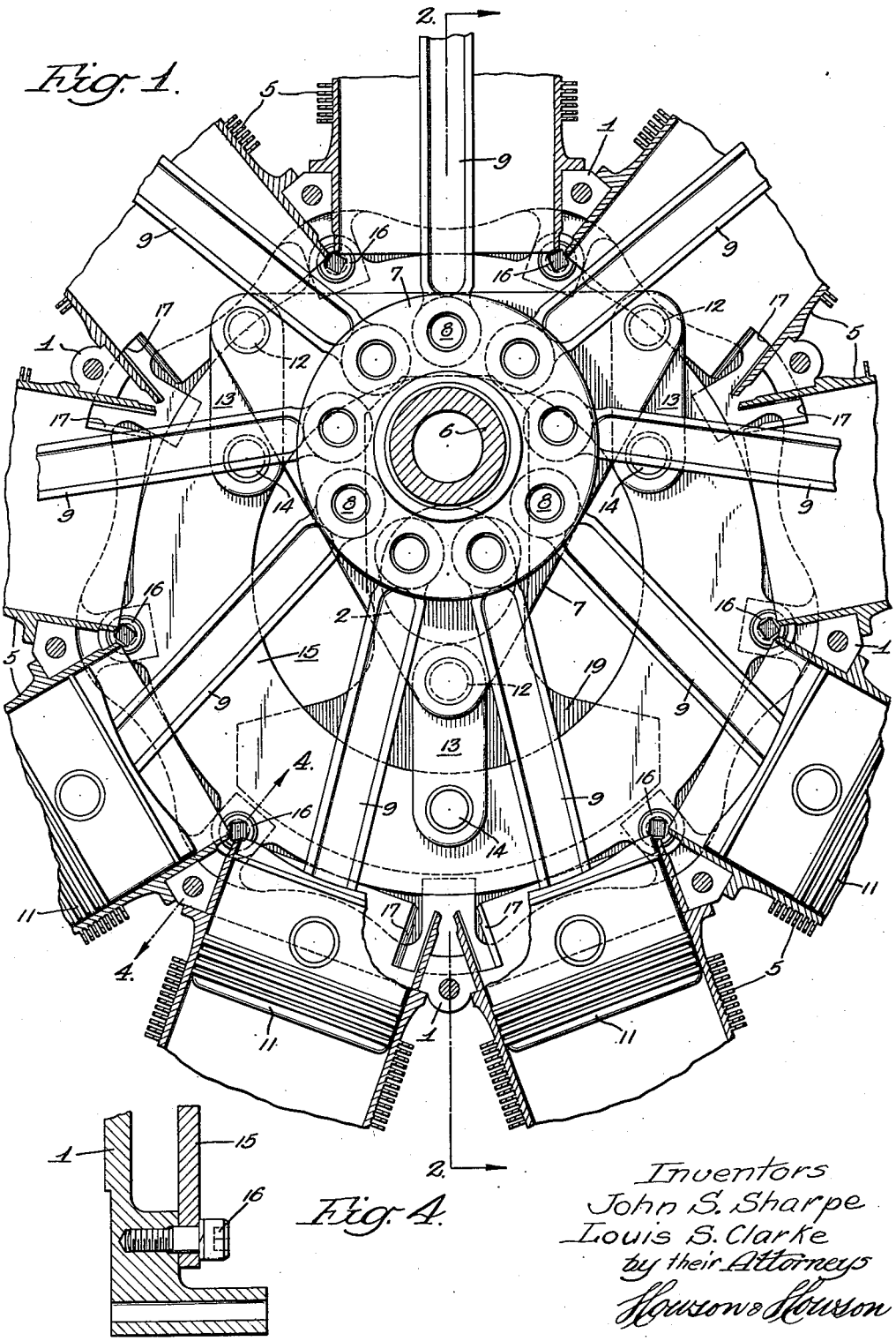
Figure 1 is a transverse sectional view of a radial engine incorporating our invention, said section being taken on the line 1—1, Fig. 2.
Fig. 4 is a section on the line 4—4, Fig. 1.

Figs. 7 and 8 are respectively enlarged sectional views on the lines 7—7 and 8—8, Fig. 6, and Figs. 9, 10 and 11 are diagrammatic sectional views illustrating certain characteristics of the operation of the connecting rod assembly.

With reference to the drawings, the engine therein illustrated comprises the usual crank case 1 and crank shaft 2, the latter being journaled in bearings 3 and 4 in the said casing. Also secured in the casing is a series of radially disposed cylinders 5.

Journaled on the crank pin 6 of the shaft 2 is a member 7, to which are pivotally connected, by means of pins 8, a series of piston rods 9, the opposite ends of which may be connected respectively and in conventional manner to the pistons 11 which operate in the cylinders 5. The member 7 has a plurality of projecting crank pins 12, these pins being three in number in the present instance and being uniformly spaced and distributed around the axis of the crank 6. Each of the pins 12 is connected by a link 13 to a pin 14, these latter pins projecting from an annular member 15 secured by screws 16 to the casing 1. The throw of the individual links 13 corresponds to the throw of the crank 6, so that while the member 7 is permitted to move in an orbital path with the crank 6, it is prevented by the links 13 from movement with respect to its own axis. It will be noted that the inner ends of the cylinders 5 immediately adjoining the respective links 13 are recessed, as indicated at 17, to afford clearance for the links 13 and the contiguous portions of the member 7 in their paths of travel.

Figure 2:
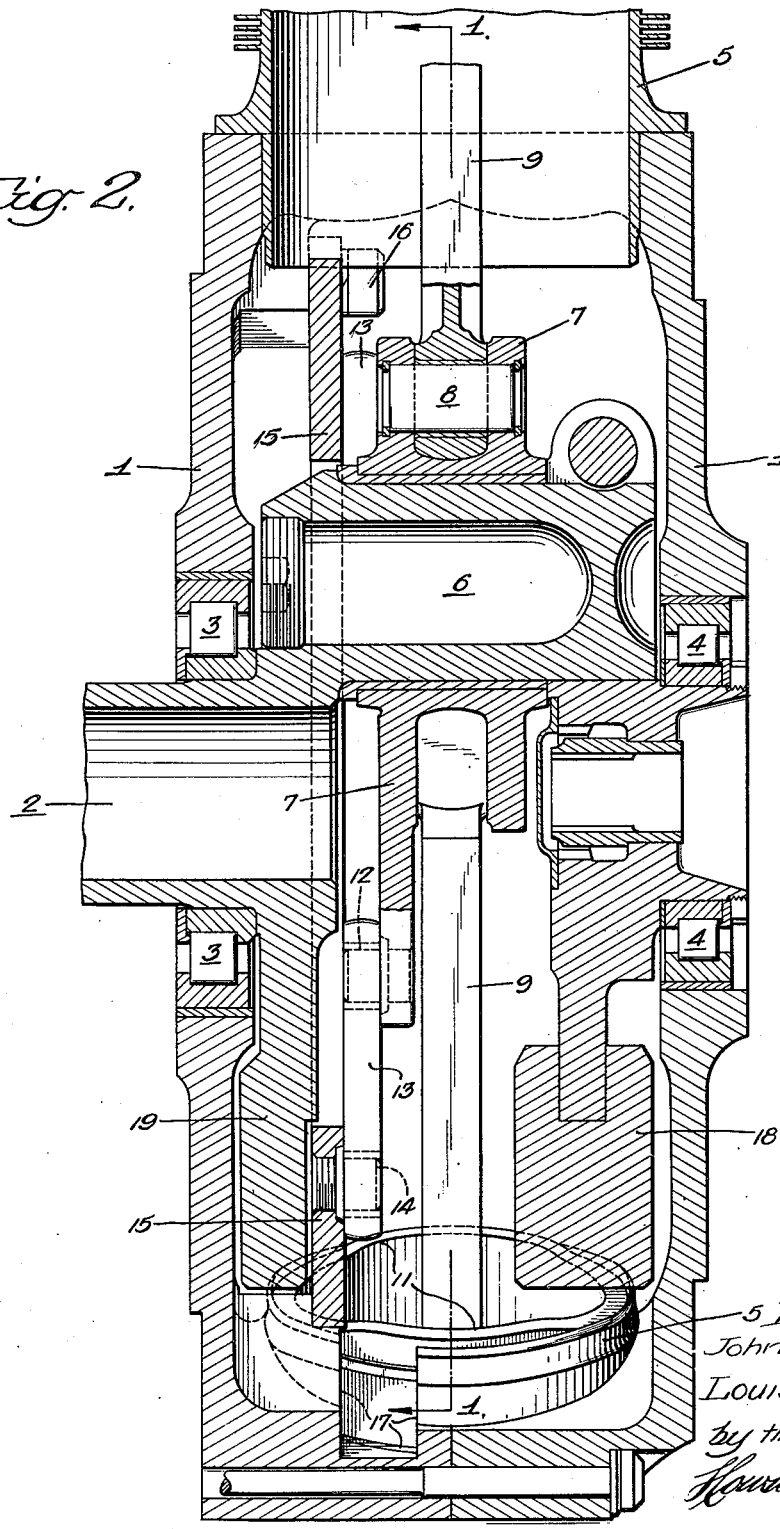
Fig. 2 is a section on the line 2—2, Fig. 1.

The crank shaft is provided with the usual counterweights 18 and 19 arranged respectively at opposite ends of the crank, and as shown in Fig. 2, the latter counterweight moves in the recessed space provided between the annular member 15 and the proximate wall of the casing 1.

Figure 5:
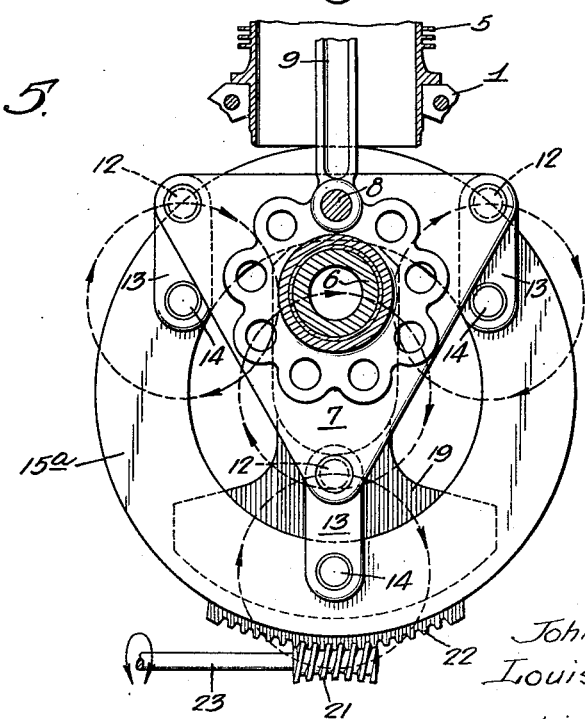
Fig. 5 is a view similar to Fig. 3 illustrating more or less diagrammatically a modification within the scope of the invention.

In the embodiment of our invention illustrated in Figs. 1 to 4, inclusive, the annular member 15, to which the links 13 are pivotally connected, as previously described, is secured in fixed position to the casing 1. In the modification of this arrangement illustrated in Fig. 5, the corresponding member 15a is capable of rotation about the axis of the shaft 2, and means for adjusting this member about the said axis is provided in the form, in the present instance, of a worm 21 and a worm wheel 22, the latter constituting a part of the annular member 15a. A shaft 23 extends from the worm 21 through the wall of the casing 1 and provides for operation of the worm from the exterior of the casing. It will be apparent that this device provides for varying the strokes of the piston with relation to the other engine functions, including "firing" in the case of gas engines, and fuel injection in the case of an engine of the Diesel type, and also for varying the compression.

In the embodiment of the invention shown in Figs. 6, 7 and 8, the annular member 15b, to which the links 13 are pivotally attached as previously described, is provided at its outer periphery with a flange 24, the outer terminal edge of which fits slidably into an annular recess 25 in the wall of the casing 1. The recess 25, and therefore the annular member 15b, is concentric with the axis of the crank shaft 2. The flange 24 has a peripheral rib 26, and this rib is confined between the wall of the casing 1 and a plurality of lugs 27 which are secured by screws 28 to the said wall. The lugs 27 are seated solidly against bosses 29 on the casing wall and are prevented from turning by means of tongues 30 which fit into corresponding grooves in the faces of the bosses. These lugs 27 form collectively with the opposed wall of the casing a guideway in which the rib 26 is fitted, so that the member 15b is held securely in position, while being free to turn about the axis of the crank shaft. A segmental part of the rib 26 is toothed as indicated at 31, and these teeth mesh with a spiral pinion 32 carried on the inner end of a stub shaft 33 journaled in the wall of the casing. Attached to the outer end of this shaft is a worm wheel 34 which meshes with a worm 35 on a shaft 36, this shaft being journaled, in the present instance, in a boss 37 extending from the wall 1 of the casing. Rotation of the shaft 36 results in a corresponding rotation of the shaft 33, and through the gear 32 effects a rotational movement of the annular member 15b. As previously set forth, this device provides for variations in the strokes of the pistons with relation to other engine functions and for varying the compression in the cylinders.

Figure 3:
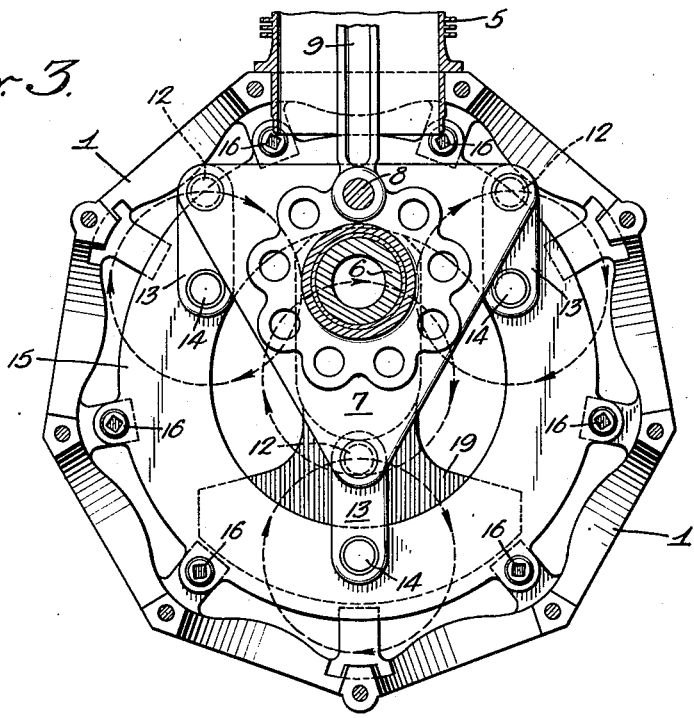
Fig. 3 is a reduced fragmentary section corresponding to Fig. 1 and illustrating certain details of construction not clearly disclosed in the latter figure.

In Figs. 1 and 3, we have shown the crank shaft assembly in what may be termed a normal position with respect to the engine cylinders. In this position, maximum compression is obtained in the cylinders. It will be noted that each of the connecting rods 9 at top dead center will be in alignment with the axes both of the crank and the crank shaft; or in other words, the axes of the crank shaft, the crank and the pin 8 will lie in a common plane. Also at top dead center, the longitudinal axes of the links 13 will be parallel to the aforesaid common plane. In this relative position of the parts, each of the pins 8 in its travel will describe a circular path the center of which lies in the center line of the associated cylinder, and the angular displacement of the connecting rods from the center line of the respective associated cylinders is the same in both the power and in the compression strokes. This same relation of parts is shown in Fig. 6, wherein it will be noted that the pinion 32 engages approximately the center of the gear segment 31 of the annular member 15b.

The effect of adjusting the annular member 15b from this position through the medium of the gear 32 as previously described is illustrated in Figs. 9, 10 and 11. As shown, the annular member 15b has been rotated in the clockwise direction, so that now when any one of the pistons is at the top of its stroke, the associated pin 8 no longer occupies a position in the common plane of the axes of the crank and crank shaft, but is to the right of this plane, as shown in Fig. 10. The pin 8 now travels in a circular path the center of which lies not in the center line of the associated cylinder, but to the right of said line, and as a result, the piston in its compression stroke approaches less closely to the cylinder head and the compression in the cylinder is reduced. It will be noted also that the angular displacement of the connecting rod from the center line of the associated cylinder now differs in the power and compression strokes. Fig. 9 shows the maximum angularity of the piston rod on the power stroke, and Fig. 11 the maximum angularity of the said rod on the compression stroke. It will be noted from these two figures that the angularity of the rod on the power stroke is considerably less than the angularity on the compression stroke.

It is recognized that in the conventional engine, the side thrust imposed on the piston during the power stroke, which thrust tends to press the piston against the side of the cylinder, is considerably greater in the power than in the compression stroke. By reducing the angularity of the connecting rod in the power stroke as described above, this side thrust of the piston on the cylinder is materially reduced, thereby substantially reducing wear in the cylinder and increasing the durability of the engine. While in the instance described this advantage is accompanied by a reduction of the compression in the cylinders, it is apparent that the engine can be designed so that for any given maximum compression desired in the engine cylinders, the differential angular relation of the connecting rod in the power and return strokes of the piston may be obtained. This could be accomplished, for example, in the assembly illustrated in Fig. 1, by setting the annular member 15 in a different angular position from that shown and correspodingly adjusting the cylinder or the length of the connecting rod to the modified stroke. In other words, with a connecting rod assembly of the character herein described, the advantage as to the differential angularity of the connecting rod in the power and return strokes is not necessary dependent upon ability to adjust the annular member to which the links 13 are connected, and does not, therefore, necessarily involve a reduction in the cylinder compression.

There may be other modification in the construction of the device without departure from the invention. The number of the connecting links between the member 7 and the annular members 15 or 15a, for example, may be increased if desired, although three of these connecting links is a practical minimum.

We claim:

1. A connecting rod assembly for engines of the type wherein the cylinders are arranged in annular series about the crank shaft, said assembly comprising a member journaled on a crank pin of the engine shaft and to which member the said rods are attached, a relatively fixed element adjustable about the axis of said shaft as a center, means connecting said member with the relatively fixed element for retaining said member substantially fixed with respect to its own axis in the crank pin while permitting said member to move in an annular path with said pin, and means for adjusting the relatively fixed element about said center to thereby effect an adjustment of said member about its own axis in the crank pin.

2. A connecting rod assembly for engines of the type wherein the cylinders are arranged in annular series about the crank shaft, said assembly comprising a member journaled on a crank pin of the engine shaft and to which member the said rods are attached, means for normally retaining said member substantially fixed with respect to its own axis in the crank pin while permitting movement of said member in an annular path with said pin, and means for adjusting said member angularly with respect to its own axis in the crank pin.

3. A connecting rod assembly for engines of the type wherein the cylinders are arranged in annular series about the crank shaft, said assembly comprising a member journaled on a crank pin of the engine shaft and to which member the said rods are attached, a relatively fixed element adjustable about the axis of said shaft as a center, a plurality of links individually pivotally connected to said member and to said element and normally retaining said member substantially fixed with respect to its own axis in the crank pin while permitting movement of said member in an annular path with said pin, and means for adjusting the relatively fixed element about said center to thereby effect an adjustment of said member about its own axis in the crank pin.

4. A connecting rod assembly for engines of the type wherein the cylinders are arranged in annular series about the crank shaft, said assembly comprising a member journaled on a crank pin of the engine shaft and to which member the said rods are attached, an annular element concentric with and confined to movements about the axis of said shaft as a center, and a plurality of links individually pivotally connected to said member and to said element and permitting movement of said member in an annular path with said pin irrespective of the angular position of said element.

5. A connecting rod assembly for internal combustion engines, said assembly comprising a member journaled on a crank pin of the engine shaft, a connecting rod pivotally attached to said member, and means for normally retaining said member substantially fixed with respect to its own axis in the crank pin while permitting movement of said member in an annular path with said pin, said means being adjustable to regulate the angular setting of said member with reference to said axis.

6. In a connecting rod assembly, the combination with a crank pin, of a member journaled on said pin, means for attaching a connecting rod to said member eccentrically with respect to the axis of the crank pin whereby adjustment of said member angularly about its axis in the pin will effect an adjustment of the proximate end of the connecting rod angularly about the said pin axis, and means for normally retaining said member substantially fixed with respect to its own axis in the crank pin while permitting movement of said member in an annular path with said pin, said means being adjustable to regulate the angular setting of said member with reference to said axis.

JOHN S. SHARPE.
LOUIS S. CLARKE.